United States Patent
Liu et al.

(10) Patent No.: US 10,797,348 B2
(45) Date of Patent: Oct. 6, 2020

(54) ELECTROLYTE AND LITHIUM-ION BATTERY

(71) Applicant: CONTEMPORARY AMPEREX TECHNOLOGY CO., LIMITED, Ningde (CN)

(72) Inventors: Jiqiong Liu, Ningde (CN); Changlong Han, Ningde (CN); Jianwei Zhu, Ningde (CN); Xiaochong Zhou, Ningde (CN); Feng Huan, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 329 days.

(21) Appl. No.: 15/845,950

(22) Filed: Dec. 18, 2017

(65) Prior Publication Data

US 2018/0191032 A1 Jul. 5, 2018

(30) Foreign Application Priority Data

Dec. 29, 2016 (CN) .......................... 2016 1 1244549

(51) Int. Cl.
*H01M 10/0567* (2010.01)
*H01M 10/0568* (2010.01)
*H01M 10/0525* (2010.01)

(52) U.S. Cl.
CPC ... *H01M 10/0567* (2013.01); *H01M 10/0525* (2013.01); *H01M 10/0568* (2013.01); *H01M 2300/0025* (2013.01)

(58) Field of Classification Search
CPC ......... H01M 10/0567; H01M 10/0525; H01M 10/0568; H01M 2300/0025
See application file for complete search history.

(56) References Cited

U.S. PATENT DOCUMENTS

| | | | |
|---|---|---|---|
| 2005/0244719 A1* | 11/2005 | Kim | H01M 10/0567 429/313 |
| 2012/0225359 A1 | 9/2012 | Xu et al. | |
| 2016/0126593 A1* | 5/2016 | Abe | H01M 10/0567 429/332 |

FOREIGN PATENT DOCUMENTS

| | | |
|---|---|---|
| CN | 1385919 A | 12/2002 |
| CN | 105745779 A | 7/2016 |
| JP | 2014170689 A | 9/2014 |
| WO | WO 2014/203912 | * 12/2014 |

OTHER PUBLICATIONS

Contemporary Amperex Technology Co., Limited, The First Office Action, CN201611244549.0, dated Jun. 25, 2019, 11 pgs.

* cited by examiner

*Primary Examiner* — Laura Weiner
(74) *Attorney, Agent, or Firm* — Morgan, Lewis & Bockius LLP

(57) ABSTRACT

The present disclosure provides an electrolyte and a lithium-ion battery. The electrolyte comprises: an organic solvent; a lithium salt dissolved in the organic solvent; and an additive. The additive comprises trifluoromethanesulfonate silyl compound, lithium fluorophosphate compound and cyclic phosphonitrile compound. The electrolyte of the present disclosure can significantly decrease the low temperature resistance of the lithium-ion battery, and improve the power performance of the lithium-ion battery, and the electrolyte of present disclosure can also significantly inhibit the gas generation during the cycle process and the storage process of the lithium-ion battery, and significantly improve the cycle performance, the high temperature storage performance and the safety performance of the lithium-ion battery.

14 Claims, No Drawings

ELECTROLYTE AND LITHIUM-ION BATTERY

CROSS-REFERENCE TO RELATED APPLICATIONS

The present application claims priority to Chinese patent application No. CN201611244549.0, filed on Dec. 29, 2016, which is incorporated herein by reference in its entirety.

FIELD OF THE PRESENT DISCLOSURE

The present disclosure relates to the field of secondary battery, and particularly relates to an electrolyte and a lithium-ion battery

BACKGROUND OF THE PRESENT DISCLOSURE

A lithium-ion battery has advantages such as large energy density, high output power, long cycle life and small environmental pollution and the like, therefore it has been widely used in electric vehicles and consumer electronics. At present, demands on the lithium-ion battery (specially the power lithium-ion battery) are: high power, long cycle life, long storage life and excellent safety performance. However, this is a big challenge for the existing lithium-ion battery system.

In general, a stable solid electrolyte interface (SEI) film can provide a better protection for the negative electrode, so as to ensure more longer cycle life and more longer storage life of the lithium-ion battery, however, it also increases interface impedance at the same time, thereby decreasing power performance of the lithium-ion battery. Therefore, how to improve the cycle life and the storage life of the lithium-ion battery but not to reduce the power performance of the lithium-ion battery at the same time becomes one of the difficulties in current research.

Moreover, a voltage of the lithium-ion battery needs to be increased in order to improve the energy density of the lithium-ion battery, however, the high voltage of the lithium-ion battery will usually improve an electrode potential of the positive active material, oxidisability of the positive active material is more stronger, side reactions during the cycle process and the storage process of the lithium-ion battery increase, and gas generation during the cycle process and the storage process of the lithium-ion battery is also serious, therefore the lithium-ion battery has worse cycle life and worse storage life, which may also result in safety problem of the lithium-ion battery.

In existing technology, the above problems may be improved by using a positive additive, the positive additive can form a protective layer on surface active points of the positive active material, thereby avoiding the surface active points of the positive active material directly contacting the electrolyte and in turn thereby inhibiting the side reactions. However, the use of the positive additive may also decrease the power performance of the lithium-ion battery.

SUMMARY OF THE PRESENT DISCLOSURE

In view of the problems existing in the background technology, an object of the present disclosure is to provide an electrolyte and a lithium-ion battery, the electrolyte can significantly decrease low temperature resistance of the lithium-ion battery, and improve power performance of the lithium-ion battery, and the electrolyte can also significantly inhibit gas generation during cycle process and storage process of the lithium-ion battery, and significantly improve cycle performance, high temperature storage performance and safety performance of the lithium-ion battery.

In order to achieve the above objects, in one aspect of the present disclosure, the present disclosure provides an electrolyte, which comprises: an organic solvent; a lithium salt dissolved in the organic solvent; and an additive. The additive comprises trifluoromethanesulfonate silyl compound, lithium fluorophosphate compound and cyclic phosphonitrile compound.

In another aspect of the present disclosure, the present disclosure provides a lithium-ion battery, which comprises the electrolyte according to the one aspect of the present disclosure.

The present disclosure has following beneficial effects:

In the electrolyte of the present disclosure, the trifluoromethanesulfonate silyl compound, the lithium fluorophosphate compound and the cyclic phosphonitrile compound are added. The three types of compounds can cooperate to act on the electrode interface of the lithium-ion battery, so as to significantly decrease the impedance of the SEI film on the surface of the negative electrode of the lithium-ion battery, decrease the low temperature resistance of the lithium-ion battery, and improve the power performance of the lithium-ion battery. The three types of compounds can also significantly inhibit the gas generation during the cycle process and the storage process of the lithium-ion battery, and significantly improve the cycle performance, the high temperature storage performance and the safety performance of the lithium-ion battery.

DETAILED DESCRIPTION

Hereinafter an electrolyte and a lithium-ion battery according to the present disclosure are described in detail.

Firstly, an electrolyte according to a first aspect of the present disclosure is described.

The electrolyte according to the first aspect of the present disclosure comprises: an organic solvent; a lithium salt dissolved in the organic solvent; and an additive. The additive comprises trifluoromethanesulfonate silyl compound, lithium fluorophosphate compound and cyclic phosphonitrile compound.

In the electrolyte according to the first aspect of the present disclosure, the trifluoromethanesulfonate silyl compound, the lithium fluorophosphate compound and the cyclic phosphonitrile compound are added. The three types of compounds can cooperate to act on the electrode interface of the lithium-ion battery, so as to significantly decrease the impedance of the SEI film on the surface of the negative electrode of the lithium-ion battery, decrease the low temperature resistance of the lithium-ion battery, and improve the power performance of the lithium-ion battery. The three types of compounds can also significantly inhibit the gas generation during the cycle process and the storage process of the lithium-ion battery, and significantly improve the cycle performance, the high temperature storage performance and the safety performance of the lithium-ion battery.

In the electrolyte according to the first aspect of the present disclosure, a structural formula of the trifluoromethanesulfonate silyl compound is represented by formula 1. In formula 1, $R_1$, $R_2$, $R_3$ each are independently one selected from a group consisting of $C_{1-5}$ alkyl, $C_{2-5}$ alkenyl, $C_{2-5}$ alkynyl and $C_{1-5}$ alkoxy, and hydrogen atoms in alkyl, alkenyl, alkynyl and alkoxy can be partially or fully substituted by one or more selected from a group consisting of F, Cl, Br, —CN, carboxylic acid group and sulfonic acid group.

Formula 1

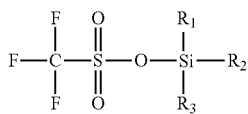

In the electrolyte according to the first aspect of the present disclosure, the trifluoromethanesulfonate silyl compound is one or more selected from a group consisting of trimethylsilyl trifluoromethanesulfonate (A1), diethylmethylsilyl trifluoromethanesulfonate (A2), triethylsilyl trifluoromethanesulfonate (A3), trifluoromethyldimethylsilyl trifluoromethanesulfonate (A4), tri(trifluoromethyl)silyl trifluoromethanesulfonate (A5), dimethylethylsilyl trifluoromethanesulfonate (A6), trivinylsilyl trifluoromethanesulfonate (A7), triethynylsilyl trifluoromethanesulfonate (A8) and triethoxsilyl trifluoromethanesulfonate (A9). The structural formulas of the above compounds are respectively represented as follows:

A1
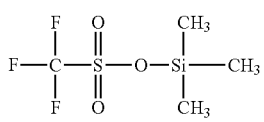

A2
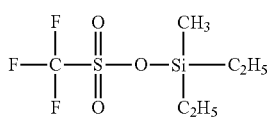

A3
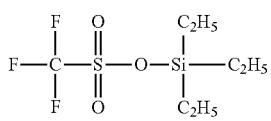

A4
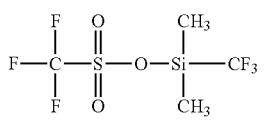

A5
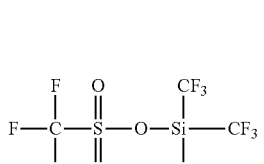

A6
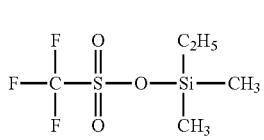

A7
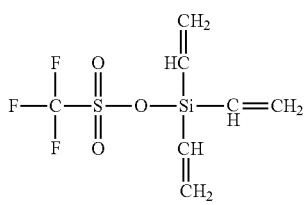

A8
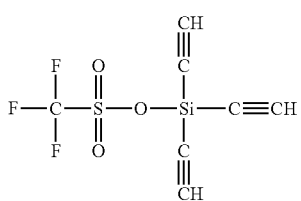

A9
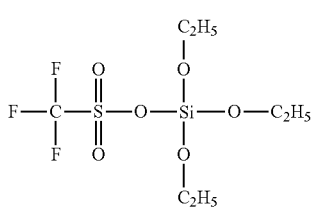

In the electrolyte according to the first aspect of the present disclosure, a content of the trifluoromethanesulfonate silyl compound may be 0.1%-8% of a total weight of the electrolyte. Preferably, the content of the trifluoromethanesulfonate silyl compound may be 0.2%-7.5% of the total weight of the electrolyte. Further preferably, the content of the trifluoromethanesulfonate silyl compound may be 0.3%-5% of the total weight of the electrolyte.

In the electrolyte according to the first aspect of the present disclosure, the lithium fluorophosphate compound may be one or two selected from a group consisting of $LiPO_2F_2$ and $LiPOF_4$.

In the electrolyte according to the first aspect of the present disclosure, a content of the lithium fluorophosphate compound may be 0.1%-5% of the total weight of the electrolyte. Preferably, the content of the lithium fluorophosphate compound may be 0.5%-3% of the total weight of the electrolyte.

In the electrolyte according to the first aspect of the present disclosure, a structural formula of the cyclic phosphonitrile compound is represented by formula 2. In formula 2, $R_4$, $R_5$, $R_6$, $R_7$, $R_8$, $R_9$ each are independently one selected from a group consisting of H, halogen atom, $C_{1-20}$ alkyl, $C_{2-20}$ alkenyl, $C_{2-20}$ alkynyl, $C_{6-20}$ aryl, $C_{1-20}$ haloalkyl, $C_{2-20}$ haloalkenyl, $C_{2-20}$ haloalkynyl, $C_{6-20}$ haloaryl, $C_{1-20}$ alkoxy, $C_{2-20}$ alkenoxy, $C_{2-20}$ alkynoxy, $C_{6-20}$ aryloxy, $C_{1-20}$ haloalkoxy, $C_{2-20}$ haloalkenoxy, $C_{2-20}$ haloalkynoxy and $C_{6-20}$ haloaryloxy, and at least two of $R_5$, $R_7$ and $R_9$ are a halogen atom. The halogen atom is F, Cl or Br.

Formula 2
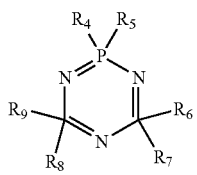

In the electrolyte according to the first aspect of the present disclosure, preferably, in formula 2, at least one of $R_4$, $R_6$, $R_8$ is one selected from a group consisting of $C_{1-20}$ alkoxy, $C_{2-20}$ alkenoxy, $C_{2-20}$ alkynoxy, $C_{6-20}$ aryloxy, $C_{1-20}$ haloalkoxy, $C_{2-20}$ haloalkenoxy, $C_{2-20}$ haloalkynoxy and $C_{6-20}$ haloaryloxy.

In the electrolyte according to the first aspect of the present disclosure, further preferably, in formula 2, $R_4$, $R_5$, $R_6$, $R_7$, $R_8$, $R_9$ each are independently one selected from a group consisting of H, halogen atom, $C_{1-10}$ alkyl, $C_{2-10}$ alkenyl, $C_{2-10}$ alkynyl, $C_{6-10}$ aryl, $C_{1-10}$ haloalkyl, $C_{2-10}$ haloalkenyl, $C_{2-10}$ haloalkynyl, $C_{6-10}$ haloaryl, $C_{1-10}$ alkoxy, $C_{2-10}$ alkenoxy, $C_{2-10}$ alkynoxy, $C_{6-10}$ aryloxy, $C_{1-10}$ haloalkoxy, $C_{2-10}$ haloalkenoxy, $C_{2-10}$ haloalkynoxy and $C_{6-10}$ haloaryloxy, and at least two of $R_5$, $R_7$ and $R_9$ are a halogen atom, and at least one of $R_4$, $R_6$, $R_8$ are independently one selected from a group consisting of $C_{1-10}$ alkoxy, $C_{2-10}$ alkenoxy, $C_{2-10}$ alkynoxy, $C_{6-10}$ aryloxy, $C_{1-10}$ haloalkoxy, $C_{2-10}$ haloalkenoxy, $C_{2-10}$ haloalkynoxy and $C_{6-10}$ haloaryloxy.

In the electrolyte according to the first aspect of the present disclosure, the cyclic phosphonitrile compound may be one or more selected from the group of compounds consisting of:

(C1)

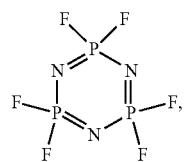

(C2)

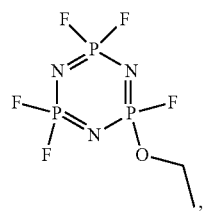

(C3)

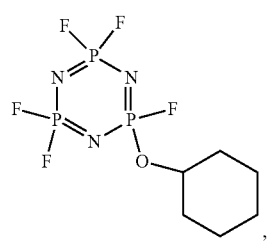

(C4)

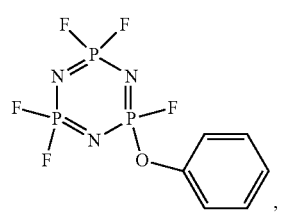

(C5)

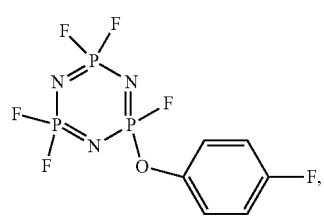

(C6)

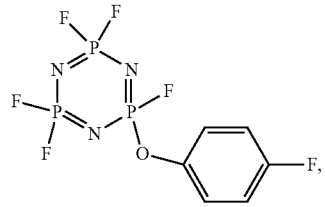

(C7)

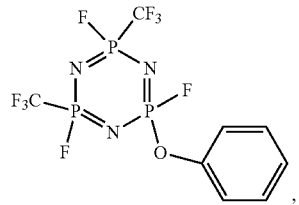

(C8)

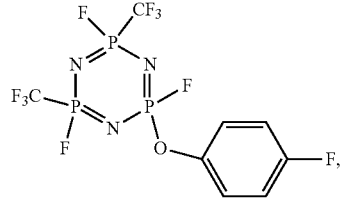

(C9)

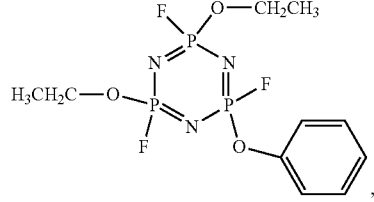

(C10)

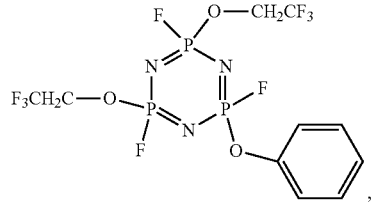

(C11)

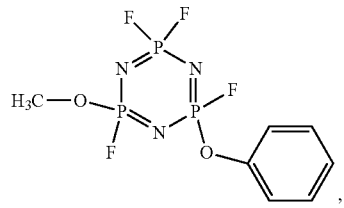

(C12)

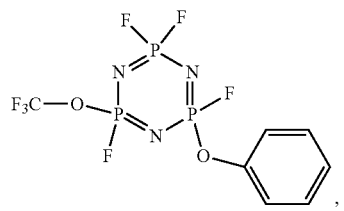

-continued (C13) 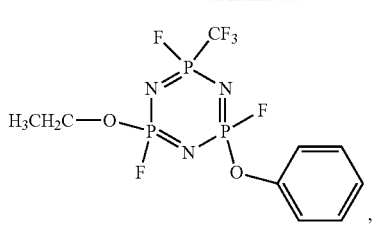, (C14) 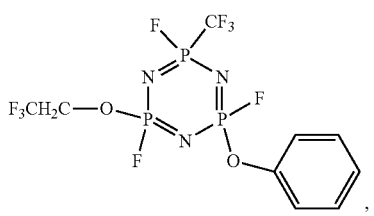, (C15) 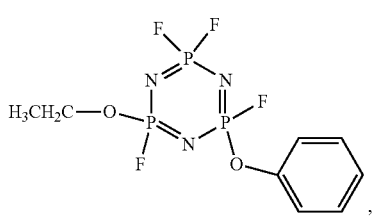, (C16) 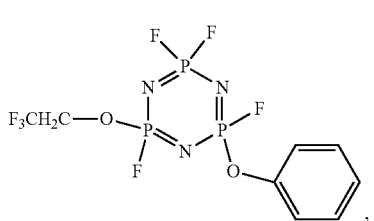, (C17) 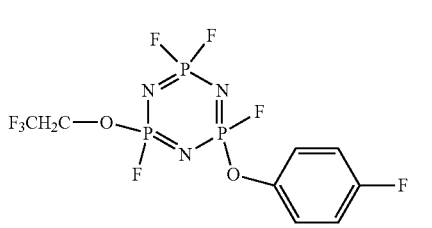 and (C18) 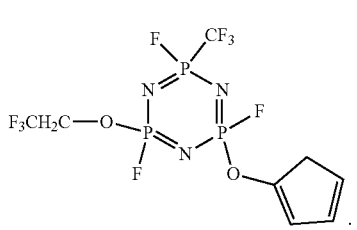.

In the electrolyte according to the first aspect of the present disclosure, a content of the cyclic phosphonitrile compound may be 0.1%-8% of the total weight of the electrolyte. Preferably, the content of the cyclic phosphonitrile compound may be 1%-5% of the total weight of the electrolyte.

In the electrolyte according to the first aspect of the present disclosure, the lithium salt may be one or more selected from a group consisting of $LiPF_6$, $LiBF_4$, $LiN(SO_2F)_2$ (LiFSI), $LiClO_4$, $LiAsF_6$, $LiB(C_2O_4)_2$ (LiBOB), $LiBF_2(C_2O_4)$ (LiDFOB), $LiN(SO_2RF)_2$ and $LiN(SO_2F)(SO_2RF)$. Preferably, the lithium salt may be one or more selected from a group consisting of $LiPF_6$, $LiN(SO_2F)_2$, $LiN(CF_3SO_2)_2$, $LiB(C_2O_4)_2$ and $LiBF_2(C_2O_4)$. Further preferably, the lithium salt may be one or more selected from a group consisting of $LiPF_6$, $LiN(SO_2F)_2$ and $LiBF_2(C_2O_4)$. RF represents $C_nF_{2n+1}$, n is an integer of 1-10. Preferably, RF may be $-CF_3$, $-C_2F_5$ or $-CF_2CF_2CF_3$.

In the electrolyte according to the first aspect of the present disclosure, a content of the lithium salt may be 6.25%-25% of the total weight of the electrolyte. Preferably, the content of the lithium salt may be 6.25%-18.8% of the total weight of the electrolyte.

In the electrolyte according to the first aspect of the present disclosure, a specific type of the organic solvent may be selected based on actual demands. Particularly, a non-aqueous organic solvent is used. The non-aqueous organic solvent may comprise carbonate ester (such as cyclic carbonate ester or chain carbonate ester), carboxylic acid ester (such as cyclic carboxylic acid ester or chain carboxylic acid ester), halocarbonate ester and the like. Specifically, the organic solvent may be one or more selected from a group consisting of ethylene carbonate, propylene carbonate, 2,3-butylene carbonate, amylene carbonate, dimethyl carbonate, diethyl carbonate, dipropyl carbonate, ethyl methyl carbonate, γ-butyrolactone, methyl propionate, methyl butyrate, ethyl acetate, ethyl propionate, propyl propionate and ethyl butyrate.

In the electrolyte according to the first aspect of the present disclosure, the additive may further comprise one or more selected from a group consisting of fluoro-cyclic carbonate ester, 1,3-propylene sulfite (PS) and vinylene carbonate (VC). A content of the fluoro-cyclic carbonate ester may be 1%-5% of the total weight of the electrolyte. A content of 1,3-propylene sulfite may be 1%-5% of the total weight of the electrolyte. A content of vinylene carbonate may be 1%-5% of the total weight of the electrolyte. The fluoro-cyclic carbonate ester can significantly improve the cycle performance of the lithium-ion battery. 1,3-propylene sulfite and/or vinylene carbonate can further inhibit the gas generation in the high temperature environment (such as the high temperature cycle process and the high temperature storage process) of the lithium-ion battery, however, a higher content of 1,3-propylene sulfite and/or vinylene carbonate may significantly increase the DCR of the lithium-ion battery. Therefore it may further improve the power performance of the lithium-ion battery, inhibit the gas generation in the high temperature environment of the lithium-ion battery, and improve the cycle performance, the high temperature storage performance and the safety performance of the lithium-ion battery by further adding one or more selected from a group consisting of fluoro-cyclic carbonate ester, 1,3-propylene sulfite and vinylene carbonate into the electrolyte.

A structural formula of the fluoro-cyclic carbonate ester is represented by formula 3. In formula 3, Rio is halogen atom or $C_{1-20}$ haloalkyl.

Formula 3

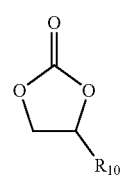

Preferably, the fluoro-cyclic carbonate ester may be one or more selected from the group of compounds consisting of:

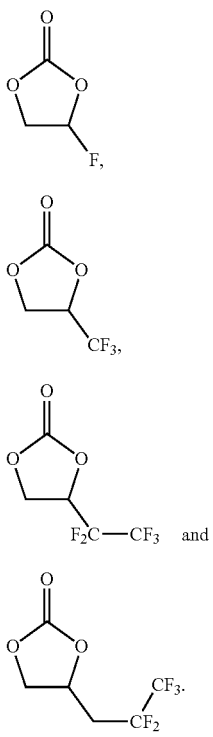

In the electrolyte according to the first aspect of the present disclosure, it should be noted that, alkyl, alkenyl, alkynyl, the halogenated compound thereof (such as haloalkyl, haloalkenyl, haloalkynyl), the oxogenated compound thereof (such as alkoxy, alkenoxy, alkynoxy) and the like may be a chain structure or a cyclic structure.

Next a lithium-ion battery according to a second aspect of the present disclosure is described.

The lithium-ion battery according to the second aspect of the present disclosure comprises the electrolyte according to the first aspect of the present disclosure.

The lithium-ion battery according to the second aspect of the present disclosure further comprises a positive electrode plate, a negative electrode plate and a separator. The separator is interposed between the positive electrode plate and the negative electrode plate.

In the lithium-ion battery according to the second aspect of the present disclosure, the positive electrode plate comprises a positive current collector and a positive film positioned on the positive current collector. The positive film comprises a positive active material, a conductive agent and a binder. The positive active material may be at least one selected from a group consisting of lithium cobaltate, ternary positive material, phosphate material and lithium manganese dioxide. Specifically, the positive active material may be one or more selected from a group consisting of $LiCoO_2$, $LiNi_xA_yB_{(1-x-y)}O_2$, $LiMPO_4$ and $Li_{1-x}(Q_yL_{z'}C_{1-y'-z'})O_2$. A, B each are independently one selected from a group consisting of Co, Al, Ni, Mn, A and B are different, $0<x<1$, $0<y<1$ and $x+y<1$. $LiMPO_4$ has an olivine structure, M is one selected from a group consisting of Co, Ni, Fe, Mn and V. Q, L, C each are independently one selected from a group consisting of Co, Ni, Fe and Mn, $0 \leq x'<1$, $0 \leq y'<1$, $0 \leq z'<1$ and $y'+z'<1$.

In the lithium-ion battery according to the second aspect of the present disclosure, the negative electrode plate comprises a negative current collector and a negative film positioned on the negative current collector. The negative film comprises a negative active material, a conductive agent and a binder. The negative active material may be one or more selected from a group consisting of lithium metal, natural graphite, artificial graphite, meso-carbon micro bead (MCMB), hard carbon, soft carbon, silicon, silicon-carbon composite, Li—Sn alloy, Li—Sn—O alloy, Sn, SnO, $SnO_2$, lithiated $TiO_2$—$Li_4Ti_5O_{12}$ having a spinel structure and Li—Al alloy.

Hereafter the present disclosure will be described in detail in combination with examples. It should be noted that, the examples described in the present disclosure are only used for explaining the present disclosure, and are not intended to limit the present disclosure. In the following examples and comparative examples, reagents, materials and instruments which are used are all commercially available unless otherwise stated.

Lithium-ion batteries of comparative examples 1-7 and examples 1-11 were all prepared in accordance with the following preparation method.

(1) Preparation of the Positive Electrode Plate $LiNi_{0.33}Co_{0.33}Mn_{0.33}O_2$ (positive active material), polyvinylidene fluoride (binder), acetylene black (conductive agent) according to a mass ratio of 98:1:1 were mixed with 1-methyl-2-pyrrolidinone (solvent), then the mixed system was stirred via a vacuum mixer until the mixed system was stable and uniform so as to obtain a positive slurry; then the positive slurry was uniformly coated on an aluminum foil; then the aluminum foil was dried under room temperature, then the aluminum foil was transferred to an air dry oven at 120° C. for 1 h, which was followed by cold pressing and cutting, and finally a positive electrode plate was obtained.

(2) Preparation of the Negative Electrode Plate

Artificial graphite (negative active material), acetylene black (conductive agent), carboxymethyl cellulose sodium solution (CMC, thickening agent), styrene-butadiene rubber latex (binder) according to a mass ratio of 97:1:1:1 were mixed with deionized water (solvent), then the mixed system was stirred in a vacuum mixer until the mixed system was stable and uniform so as to obtain a negative slurry; then the negative slurry was uniformly coated on a copper foil; then the copper foil was dried under room temperature, then the copper foil was transferred to an air dry oven at 120° C. for 1 h, which was followed by cold pressing and cutting, and finally a negative electrode plate was obtained.

(3) Preparation of the Electrolyte

The organic solvent was a mixed solution comprising ethylene carbonate (EC), ethyl methyl carbonate (EMC) and diethyl carbonate (DEC), a weight ratio of EC, EMC and DEC was 1:1:1. The lithium salt was $LiPF_6$, a content of $LiPF_6$ was 12.5% of a total weight of the electrolyte. Specific type and content of each additive were illustrated in table 1, the content of the additive was a weight percentage calculated based on the total weight of the electrolyte.

(4) Preparation of the Lithium-Ion Battery

The positive electrode plate, the negative electrode plate and the separator were wound together to form a cell, then the cell was put into a package shell, then the electrolyte was injected, which was followed by packaging, standing, hot and cold pressing, formation, degassing, capacity testing and the like, and finally a lithium-ion battery was obtained.

TABLE 1

Types and contents of additives of comparative examples 1-7 and examples 1-11

|  | Additive A | | Additive B | | Additive C | | Additive D | | PS | VC |
|---|---|---|---|---|---|---|---|---|---|---|
|  | Type | Content | Type | Content | Type | Content | Type | Content | Content | Content |
| Comparative example 1 | / | / | / | / | / | / | / | / | / | / |
| Comparative example 2 | A1 | 2.0% | / | / | / | / | / | / | / | / |
| Comparative example 3 | / | / | B1 | 1.0% | / | / | / | / | / | / |
| Comparative example 4 | / | / | / | / | C2 | 2.0% | / | / | / | / |
| Comparative example 5 | A1 | 2.0% | B1 | 1.0% | / | / | / | / | / | / |
| Comparative example 6 | / | / | B1 | 1.0% | C2 | 2.0% | / | / | / | / |
| Comparative example 7 | A1 | 2.0% | / | / | C2 | 2.0% | / | / | / | / |
| Example 1 | A1 | 2.0% | B1 | 1.0% | C2 | 2.0% | / | / | / | / |
| Example 2 | A2 | 5.0% | B2 | 0.1% | C2 | 2.0% | / | / | / | / |
| Example 3 | A1 | 1.0% | B1 | 1.0% | C2 | 2.0% | D1 | 5% | / | / |
| Example 4 | A1 | 0.1% | B1 | 1.0% | C2 | 2.0% | D1 | 5% | / | / |
| Example 5 | A3 | 8.0% | B1 | 0.5% | C2 | 2.0% | D1 | 1% | / | / |
| Example 6 | A1 | 1.0% | B1 | 3.0% | C1 | 2.0% | D1 | 5% | / | / |
| Example 7 | A4 | 1.0% | B1 | 5.0% | C2 | 0.1% | D2 | 5% | / | / |
| Example 8 | A5 | 0.2% | B1 | 1.0% | C2 | 5.0% | D3 | 5% | / | / |
| Example 9 | A1 | 0.3% | B1 | 1.0% | C3 | 8.0% | D1 | 5% | 1% | / |
| Example 10 | A1 | 1.0% | B1 | 1.0% | C2 | 1.0% | D1 | 5% | 5% | 5% |
| Example 11 | A1 | 1.0% | B1 | 1.0% | C2 | 1.0% | D1 | 5% | 1% | 1% |

Hereafter performance tests on the lithium-ion batteries were described.

(1) Testing of Low Temperature DC Discharge Resistance of the Lithium-Ion Battery.

At 25° C., the lithium-ion battery was stood for 30 min, then the lithium-ion battery was charged to 4.2 V at a constant current of 1 C, then the lithium-ion battery was charged to a current less than or equal to 0.05 C at a constant voltage of 4.2 V and then stood for 5 min; then the lithium-ion battery was discharged to 2.8 V at a constant current of 1 C, the obtained discharge capacity was a rated capacity of the lithium-ion battery, that was the lithium-ion battery was under 100% SOC.

Then the lithium-ion battery was charged for 30 min at a constant current of 1 C, the charge state of the lithium-ion battery was adjusted to 50% SOC, then the lithium-ion battery was transferred to a low temperature environment at −20° C. and stand for more than or equal to 2 h to make the internal temperature and the external temperature of the lithium-ion battery same, finally the lithium-ion battery was discharged for 10 s at a constant current of 0.3 C, the voltage before and after the discharge process were marked respectively, and a calculation formula of DC discharge resistance (DCR) was as follows:

DCR=$(U_0-U_1)/I$. $U_0$ represented the voltage before the discharge process and $U_1$ represented the voltage after the discharge process.

(2) Testing of Cycle Life Under 25° C. and 45° C. of the Lithium-Ion Battery.

Respectively under 25° C. and 45° C., the lithium-ion battery was charged to 4.2 V at a constant current of 1 C, then the lithium-ion battery was charged to 0.05 C at a constant voltage of 4.2 V, then the lithium-ion battery was discharged to 2.8 V at a constant current of 1 C, this process was the first cycle process, the obtained discharge capacity was the first cycle discharge capacity; then the cycle process of the lithium-ion battery was repeated until the discharge capacity of the lithium-ion battery was less than or equal to 80% of the first cycle discharge capacity, the cycle number of the lithium-ion battery was marked.

(3) Testing of High Temperature Storage Capacity of the Lithium-Ion Battery.

At 25° C., the lithium-ion battery was stood for 30 min, then the lithium-ion battery was charged to 4.2 V at a constant current of 1 C, then the lithium-ion battery was charged to a current less than or equal to 0.05 C at a constant voltage of 4.2 V and then stood for 5 min, then the lithium-ion battery was discharged to 2.5 V at a constant current of 1 C, the obtained discharge capacity was the capacity of the lithium-ion battery before the high temperature storage process.

At 25° C., the lithium-ion battery was stood for 30 min, then the lithium-ion battery was charged to 4.2 V at a constant current of 1 C, then the lithium-ion battery was charged to a current less than or equal to 0.05 C at a constant voltage of 4.2 V and then stood for 5 min, then the lithium-ion battery was stored for 30 days under 60° C., and finally the lithium-ion battery was discharged to 2.5 V at a constant current of 1 C, the obtained discharge capacity was the capacity of the lithium-ion battery after the high temperature storage process.

Reversible capacity retention rate of the lithium-ion battery after stored for 30 days under 60° C. (%)=(capacity after the high temperature storage process/capacity before the high temperature storage process)×100%.

(4) Testing of Gas Generation During High Temperature Storage Process of the Lithium-Ion Battery At 25° C., the lithium-ion battery was stood for 30 min, then the lithium-ion battery was charged to 4.2 V at a constant current of 1 C, then the lithium-ion battery was charged to 0.05 C at a constant voltage of 4.2 V to keep the lithium-ion battery under a 4.2 V full charge state, then the lithium-ion battery was put into a high temperature furnace for 10 days under 70° C., the volume expansion rate of the lithium-ion battery after stored for 10 days under 70° C. was calculated.

Volume expansion rate of the lithium-ion battery after stored for 10 days under 70° C. (%)=(volume after storage−volume before storage)/volume before storage×100%.

TABLE 2

Testing results of comparative examples 1-7 and examples 1-11

| | DCR (mohm) | 25° C. cycle number | 45° C. cycle number | Reversible capacity retention rate after stored for 30 days under 60° C. | Volume expansion rate after stored for 10 days under 70° C. |
|---|---|---|---|---|---|
| Comparative example 1 | 500 | 420 | 310 | 80% | 30% |
| Comparative example 2 | 380 | 440 | 330 | 80% | 29% |
| Comparative example 3 | 420 | 400 | 290 | 87% | 10% |
| Comparative example 4 | 470 | 425 | 326 | 75% | 30% |
| Comparative example 5 | 378 | 419 | 310 | 81% | 15% |
| Comparative example 6 | 377 | 430 | 331 | 80% | 31% |
| Comparative example 7 | 371 | 424 | 312 | 79% | 31% |
| Example 1 | 362 | 820 | 789 | 92% | 9% |
| Example 2 | 360 | 821 | 772 | 91% | 27% |
| Example 3 | 361 | 1020 | 838 | 95% | 10% |
| Example 4 | 419 | 900 | 789 | 90% | 12% |
| Example 5 | 358 | 940 | 788 | 89% | 19% |
| Example 6 | 386 | 970 | 794 | 88% | 10% |
| Example 7 | 385 | 887 | 658 | 87% | 9% |
| Example 8 | 416 | 885 | 670 | 90% | 18% |
| Example 9 | 401 | 889 | 695 | 84% | 22% |
| Example 10 | 399 | 990 | 770 | 94% | 8% |
| Example 11 | 408 | 940 | 766 | 93% | 7% |

Compared with comparative examples 1-7, the trifluoromethanesulfonate silyl compound, the lithium fluorophosphate compound and the cyclic phosphonitrile compound were added into the electrolytes of the lithium-ion batteries of examples 1-11, the above three types of compounds could cooperate to act on the electrode interface of the lithium-ion battery, so as to significantly decrease the impedance of the SEI film on the surface of the negative electrode of the lithium-ion battery, decrease the low temperature DCR of the lithium-ion battery and improve the power performance of the lithium-ion battery, and the above three types of compounds could also significantly inhibit the gas generation during the cycle process and the storage process of the lithium-ion battery, and significantly improve the cycle performance, the high temperature storage performance and the safety performance of the lithium-ion battery.

It might significantly decrease the low temperature DCR of the lithium-ion battery by adding the trifluoromethanesulfonate silyl compound into the electrolyte, this was mainly because the trifluoromethanesulfonate silyl compound could participate in the formation of the SEI film on the surface of the negative electrode prior to the organic solvent, so as to inhibit reductive decomposition of the organic solvent, and the resistance of the formed SEI film was also lower, thereby decreasing the low temperature DCR of the lithium-ion battery; meanwhile, silyl group in the trifluoromethanesulfonate silyl compound might change the composition of the formed SEI film so as to form a thinner SEI film to make the lithium ions pass through the formed SEI film much easier, thereby further decreasing the low temperature DCR of the lithium-ion battery, and improving the power performance of the lithium-ion battery. The fluorophosphates lithium compound might participate in the formation of the CEI (cathode electrolyte interface) film on the surface of the positive electrode so as to inhibit oxidative decomposition of both $LiPF_6$ and the organic solvent on the surface of the positive electrode, and inhibit the gas generation during the high temperature storage process of the lithium-ion battery; meanwhile, the formed CEI film might protect the positive electrode, therefore it was also helpful to decrease the low temperature DCR of the lithium-ion battery; moreover, the formed CEI film might separate the positive active material and the electrolyte and avoid the positive active material directly contacting the electrolyte, therefore it might also improve the high temperature storage performance of the lithium-ion battery to a certain extent by adding the lithium fluorophosphate compound into the electrolyte. The cyclic phosphonitrile compound could be decomposed into polyphosphate, the polyphosphate might participate in the formation of the SEI film on the surface of the negative electrode, so as to effectively decrease the surface resistance of the negative electrode; moreover, the cyclic phosphonitrile compound might also neutralize the hydrofluoric acid in the electrolyte, thereby reducing corrosion of the hydrofluoric acid on the positive protective film and the negative protective film, and inhibiting the gas generation during the high temperature storage process of the lithium-ion battery; moreover, the cyclic phosphonitrile compound might further improve the cycle performance of the lithium-ion battery, however, a too higher content of the cyclic phosphonitrile compound might increase the gas generation during the high temperature storage process of the lithium-ion battery.

In comparative examples 2-7, it would not improve the power performance, the cycle performance and the high temperature storage performance of the lithium-ion battery at the same time by adding only one or two selected from a group consisting of the trifluoromethanesulfonate silyl compound, the lithium fluorophosphate compound and the cyclic phosphonitrile compound into the electrolyte.

In examples 3-11, it could significantly improve the cycle performance of the lithium-ion battery by adding the fluoro-cyclic carbonate ester into the electrolyte, however, it would also make the gas generation during the high temperature storage process of the lithium-ion battery slight higher. It could further decrease the gas generation during the high temperature storage process of the lithium-ion battery by adding PS and VC into the electrolyte, however, a higher content of PS and VC would make the low temperature DCR of the lithium-ion battery a little higher, and the power performance of the lithium-ion battery was also slightly worse. Therefore it might further improve the power performance of the lithium-ion battery and inhibit the gas generation during the high temperature storage process of the lithium-ion battery by further adding one or more selected from a group consisting of the fluoro-cyclic carbonate ester, PS and VC into the electrolyte with an appropriate content, and the cycle performance and the high temperature storage performance of the lithium-ion battery could be further improved.

What is claimed is:

1. An electrolyte, comprising:
   an organic solvent;
   a lithium salt dissolved in the organic solvent; and
   an additive;
   the additive comprising trifluoromethanesulfonate silyl compound, lithium fluorophosphate compound and cyclic phosphonitrile compound;
   the trifluoromethanesulfonate silyl compound being one or more selected from a group consisting of trimethylsilyl trifluoromethanesulfonate, diethylmethylsilyl trifluoromethanesulfonate, triethylsilyl trifluoromethanesulfonate, trifluoromethyldimethylsilyl trifluoromethanesulfonate, tri(trifluoromethyl)silyl trifluoromethanesulfonate, dimethylethylsilyl trifluoromethanesulfonate, trivinylsilyl trifluoromethanesulfonate, triethynylsilyl trifluoromethanesulfonate and triethoxsilyl trifluoromethanesulfonate;
   a content of the trifluoromethanesulfonate silyl compound being 0.1%-8% of a total weight of the electrolyte;
   a content of the lithium fluorophosphate compound being 0.1%-5% of the total weight of the electrolyte;
   a content of the cyclic phosphonitrile compound being 0.1%-8% of the total weight of the electrolyte; and
   a content of the lithium salt being 6.25%-25% of the total weight of the electrolyte.

2. The electrolyte according to claim 1, wherein the lithium fluorophosphate compound is one or two selected from a group consisting of $LiPO_2F_2$ and $LiPOF_4$.

3. The electrolyte according to claim 1, wherein a structural formula of the cyclic phosphonitrile compound is represented by formula 2;

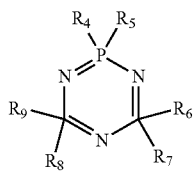

formula 2 in formula 2, $R_4$, $R_5$, $R_6$, $R_7$, $R_8$, $R_9$ each are independently one selected from a group consisting of H, halogen atom, $C_{1-20}$ alkyl, $C_{2-20}$ alkenyl, $C_{2-20}$ alkynyl, $C_{6-20}$ aryl, $C_{1-20}$ haloalkyl, $C_{2-20}$ haloalkenyl, $C_{2-20}$ haloalkynyl, $C_{6-20}$ haloaryl, $C_{1-20}$ alkoxy, $C_{2-20}$ alkenoxy, $C_{2-20}$ alkynoxy, $C_{6-20}$ aryloxy, $C_{1-20}$ haloalkoxy, $C_{2-20}$ haloalkenoxy, $C_{2-20}$ haloalkynoxy and $C_{6-20}$ haloaryloxy, and at least two of $R_5$, $R_7$ and $R_9$ are a halogen atom.

4. The electrolyte according to claim 3, wherein at least one of $R_4$, $R_6$, $R_8$ is one selected from a group consisting of $C_{1-20}$ alkoxy, $C_{2-20}$ alkenoxy, $C_{2-20}$ alkynoxy, $C_{6-20}$ aryloxy, $C_{1-20}$ haloalkoxy, $C_{2-20}$ haloalkenoxy, $C_{2-20}$ haloalkynoxy and $C_{6-20}$ haloaryloxy.

5. The electrolyte according to claim 3, wherein the cyclic phosphonitrile compound is one or more selected from the group of compounds consisting of:

(C1)

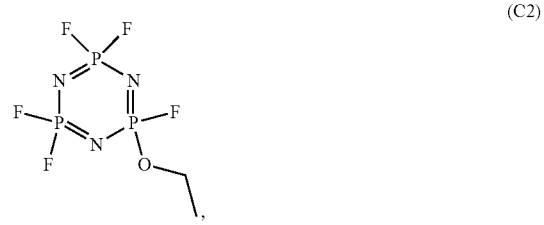

(C2)

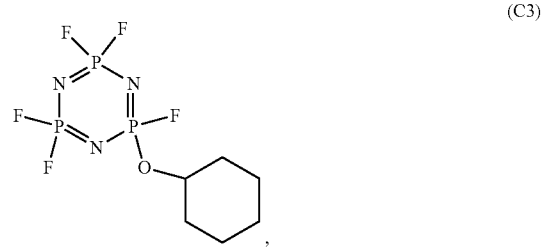

(C3)

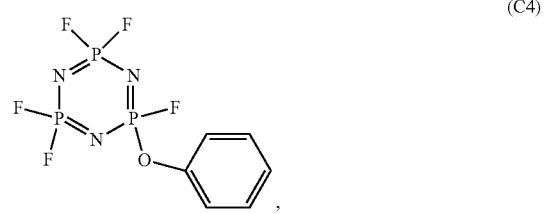

(C4)

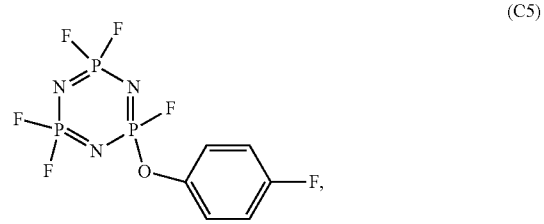

(C5)

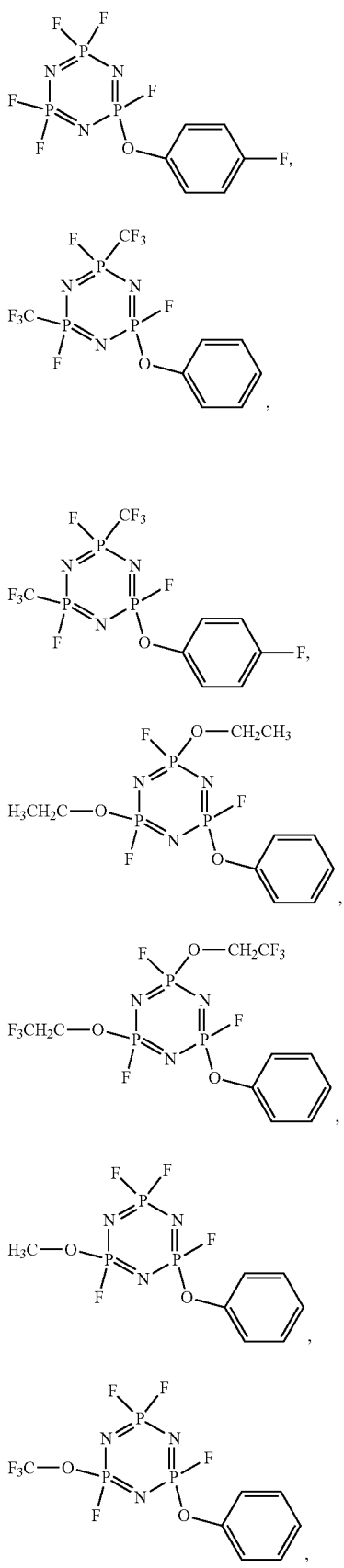

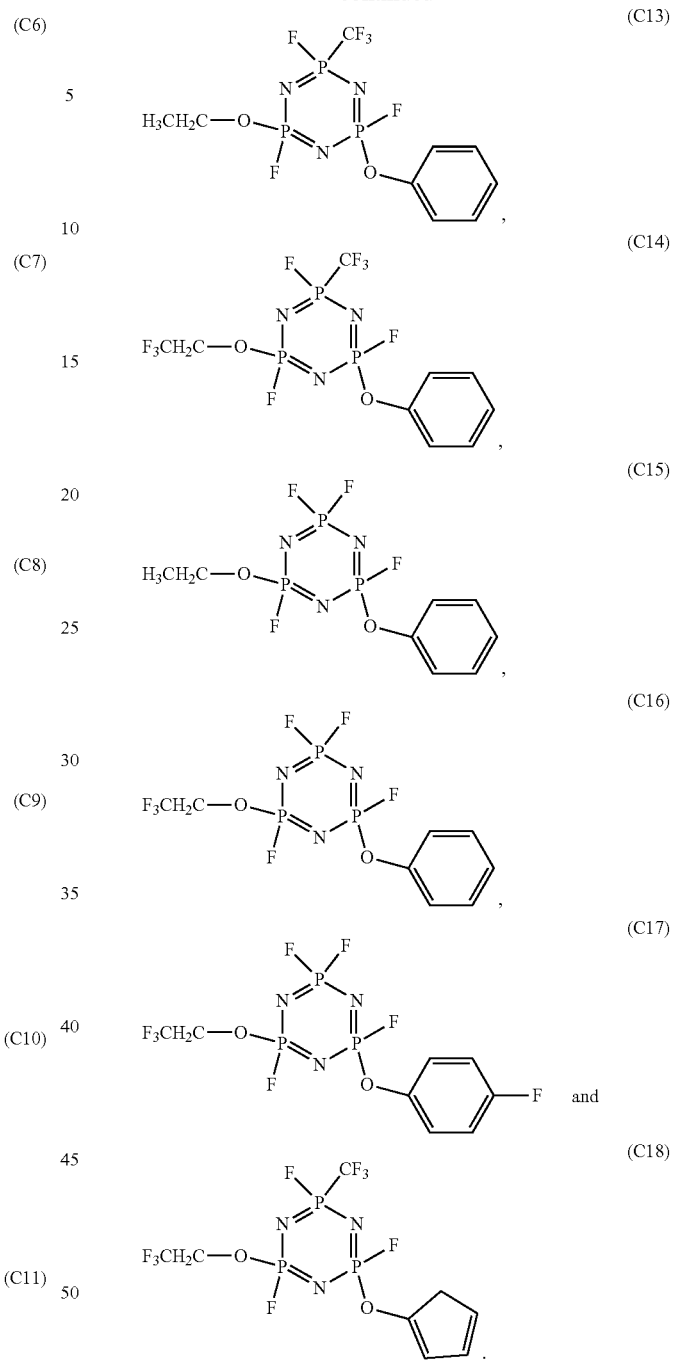

6. The electrolyte according to claim 1, wherein
the content of the trifluoromethanesulfonate silyl compound is 0.3%-5% of the total weight of the electrolyte;
the content of the lithium fluorophosphate compound is 0.5%-3% of the total weight of the electrolyte;
the content of the cyclic phosphonitrile compound is 1%-5% of the total weight of the electrolyte.

7. The electrolyte according to claim 1, wherein the additive further comprises one or more selected from a group consisting of fluoro-cyclic carbonate ester, 1,3-propylene sulfite and vinylene carbonate;
a content of the fluoro-cyclic carbonate ester is 1%-5% of the total weight of the electrolyte;

a content of 1,3-propylene sulfite is 1%-5% of the total weight of the electrolyte; and a content of vinylene carbonate is 1%-5% of the total weight of the electrolyte.

8. A lithium-ion battery comprising an electrolyte, the electrolyte comprising:

an organic solvent;

a lithium salt dissolved in the organic solvent; and an additive;

the additive comprising trifluoromethanesulfonate silyl compound, lithium fluorophosphate compound and cyclic phosphonitrile compound;

the trifluoromethanesulfonate silyl compound being one or more selected from a group consisting of trimethylsilyl trifluoromethanesulfonate, diethylmethylsilyl trifluoromethanesulfonate, triethylsilyl trifluoromethanesulfonate, trifluoromethyldimethylsilyl trifluoromethanesulfonate, tri(trifluoromethyl)silyl trifluoromethanesulfonate, dimethylethylsilyl trifluoromethanesulfonate, trivinylsilyl trifluoromethanesulfonate, triethynylsilyl trifluoromethanesulfonate and triethoxsilyl trifluoromethanesulfonate;

a content of the trifluoromethanesulfonate silyl compound being 0.1%-8% of a total weight of the electrolyte;

a content of the lithium fluorophosphate compound being 0.1%-5% of the total weight of the electrolyte;

a content of the cyclic phosphonitrile compound being 0.1%-8% of the total weight of the electrolyte;

a content of the lithium salt being 6.25%-25% of the total weight of the electrolyte.

9. The lithium-ion battery according to claim 8, wherein the lithium fluorophosphate compound is one or two selected from a group consisting of $LiPO_2F_2$ and $LiPOF_4$.

10. The lithium-ion battery according to claim 8, wherein a structural formula of the cyclic phosphonitrile compound is represented by formula 2;

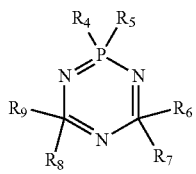

formula 2 in formula 2, $R_4$, $R_5$, $R_6$, $R_7$, $R_8$, $R_9$ each are independently one selected from a group consisting of H, halogen atom, $C_{1-20}$ alkyl, $C_{2-20}$ alkenyl, $C_{2-20}$ alkynyl, $C_{6-20}$ aryl, $C_{1-20}$ haloalkyl, $C_{2-20}$ haloalkenyl, $C_{2-20}$ haloalkynyl, $C_{6-20}$ haloaryl, $C_{1-20}$ alkoxy, $C_{2-20}$ alkenoxy, $C_{2-20}$ alkynoxy, $C_{6-20}$ aryloxy, $C_{1-20}$ haloalkoxy, $C_{2-20}$ haloalkenoxy, $C_{2-20}$ haloalkynoxy and $C_{6-20}$ haloaryloxy, and at least two of $R_5$, $R_7$ and $R_9$ are a halogen atom.

11. The electrolyte lithium-ion battery according to claim 10, wherein at least one of $R_4$, $R_6$, $R_8$ is one selected from a group consisting of $C_{1-20}$ alkoxy, $C_{2-20}$ alkenoxy, $C_{2-20}$ alkynoxy, $C_{6-20}$ aryloxy, $C_{1-20}$ haloalkoxy, $C_{2-20}$ haloalkenoxy, $C_{2-20}$ haloalkynoxy and $C_{6-20}$ haloaryloxy.

12. The lithium-ion battery according to claim 10, wherein the cyclic phosphonitrile compound is one or more selected from the group of compounds consisting of:

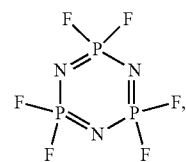 (C1)

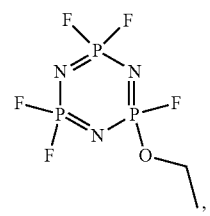 (C2)

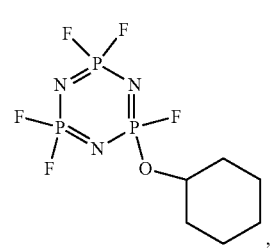 (C3)

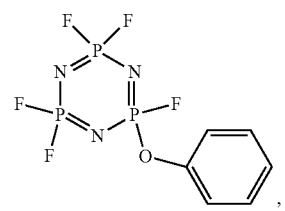 (C4)

(C5)

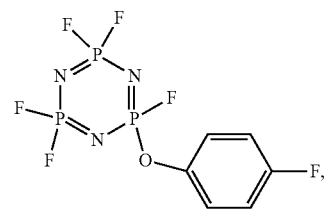 (C6)

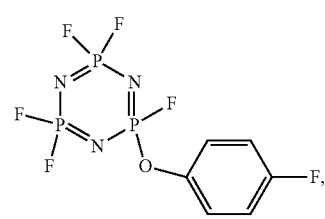

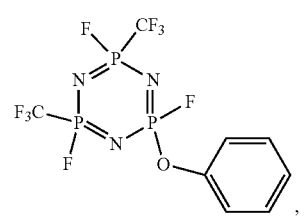 (C7)

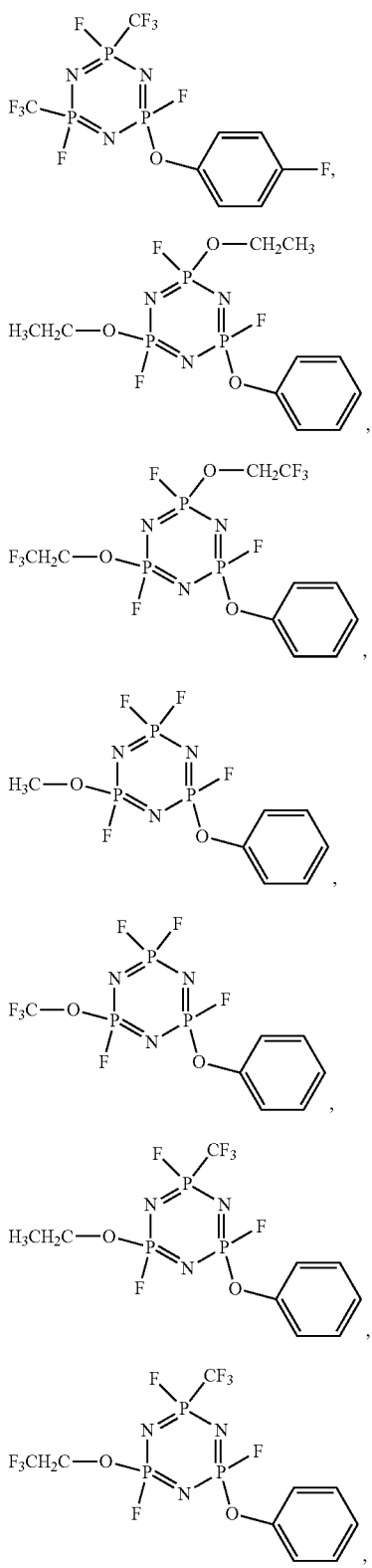

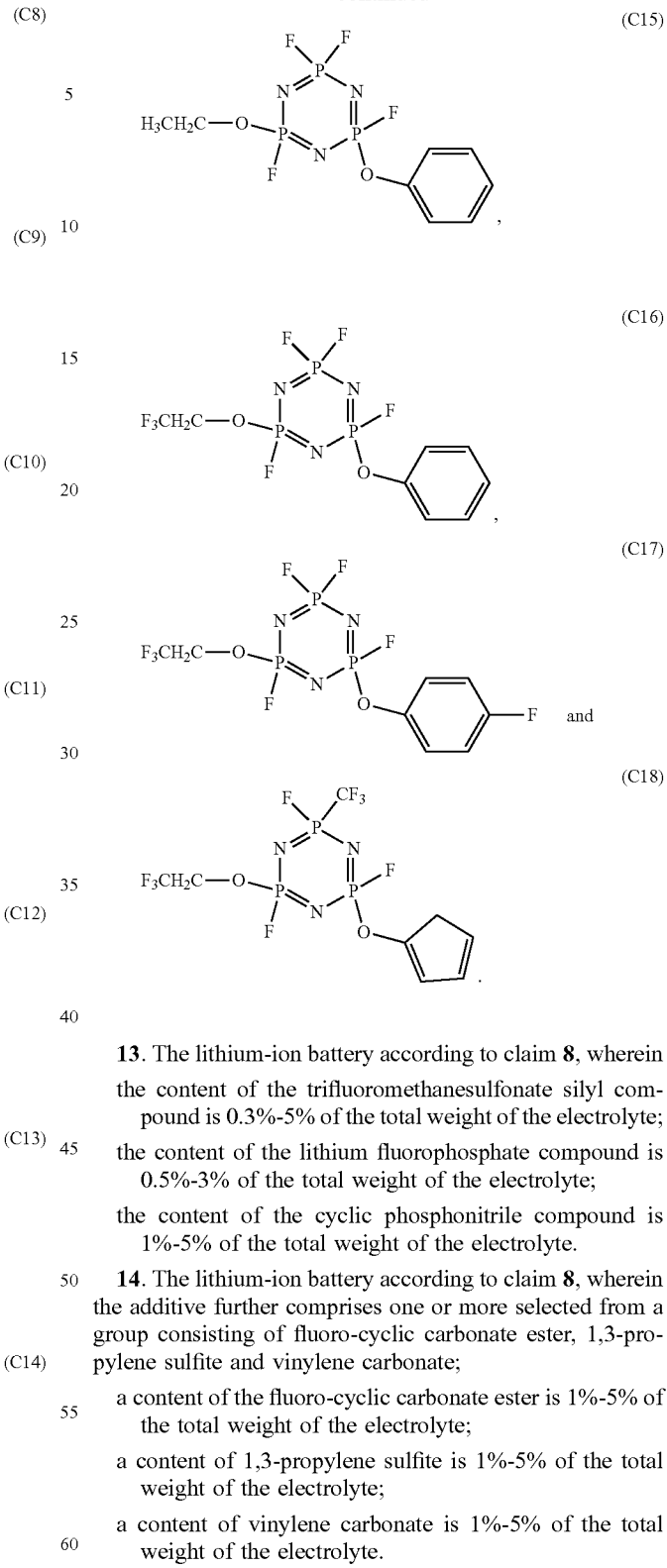

13. The lithium-ion battery according to claim 8, wherein
the content of the trifluoromethanesulfonate silyl compound is 0.3%-5% of the total weight of the electrolyte;
the content of the lithium fluorophosphate compound is 0.5%-3% of the total weight of the electrolyte;
the content of the cyclic phosphonitrile compound is 1%-5% of the total weight of the electrolyte.

14. The lithium-ion battery according to claim 8, wherein the additive further comprises one or more selected from a group consisting of fluoro-cyclic carbonate ester, 1,3-propylene sulfite and vinylene carbonate;
a content of the fluoro-cyclic carbonate ester is 1%-5% of the total weight of the electrolyte;
a content of 1,3-propylene sulfite is 1%-5% of the total weight of the electrolyte;
a content of vinylene carbonate is 1%-5% of the total weight of the electrolyte.

* * * * *